(12) United States Patent
Imamura et al.

(10) Patent No.: US 6,762,772 B1
(45) Date of Patent: Jul. 13, 2004

(54) INFORMATION DISPLAY APPARATUS AND NAVIGATION APPARATUS

(75) Inventors: Yasuji Imamura, Okazaki (JP); Hiroshi Kako, Obu (JP)

(73) Assignee: Denso Corporation, Kariya (JP)

( * ) Notice: Subject to any disclaimer, the term of this patent is extended or adjusted under 35 U.S.C. 154(b) by 496 days.

(21) Appl. No.: 09/604,043

(22) Filed: Jun. 26, 2000

(30) Foreign Application Priority Data

Jun. 29, 1999 (JP) ............................................ 11-184236

(51) Int. Cl.[7] .......................... G09G 5/00; G08G 1/123; G01C 21/26
(52) U.S. Cl. ....................... 345/700; 345/705; 345/854; 701/200; 701/211; 340/988
(58) Field of Search ................................. 345/700, 704, 345/705, 764, 782, 810, 835, 853–855; 701/200, 201, 208, 211; 340/988, 990, 995

(56) References Cited

U.S. PATENT DOCUMENTS

| | | | |
|---|---|---|---|
| 4,535,334 A | 8/1985 | Tagami et al. | 340/995 |
| 5,243,528 A | * 9/1993 | Lefebvre | 701/211 |
| 5,311,434 A | 5/1994 | Tamai | 701/210 |
| 6,119,060 A | 9/2000 | Takayama et al. | |
| 6,128,571 A | * 10/2000 | Ito et al. | 701/201 |

FOREIGN PATENT DOCUMENTS

| | | |
|---|---|---|
| JP | 63-184007 | 7/1988 |
| JP | 01-076332 | 3/1989 |
| JP | 01-312624 | 12/1989 |
| JP | 02-242184 | 9/1990 |
| JP | 4-149714 | 5/1992 |
| JP | 9-244596 | 9/1997 |
| JP | 10-291409 | 11/1998 |

* cited by examiner

*Primary Examiner*—Sy D. Luu
(74) *Attorney, Agent, or Firm*—Posz & Bethards, PLC

(57) ABSTRACT

A navigation apparatus, which can reduce time to restore a display condition as much as possible, even when it becomes necessary to restart during executing software, by omitting several initializing processes when the apparatus restarts. In a navigation apparatus, at a time of startup, a display controller is initialized and an initial picture is displayed, so that other initializing process is performed. After that, a present position is displayed and normal navigation process is performed. When a control is complicated as a result of executing plural programs at same time, improper exception occurs and then restarts. In this time, as a pre-process, a map display picture of the present position is stored in an external memory. At a restart process, the display controller firstly displays the map display regarding the present position, and the restart process is performed under this condition so as to restore a normal condition. A display condition can be restored without user's recognition, because there is no black picture condition in the display unit.

21 Claims, 8 Drawing Sheets

INFORMATION DISPLAY APPARATUS AND NAVIGATION APPARATUS

CROSS REFERENCE TO RELATED APPLICATION

This application is based upon Japanese Patent Application No. Hei. 11-184236 filed on Jun. 29, 1999, the contents of which are incorporated herein by reference.

BACKGROUND OF THE INVENTION

1. Field of the Invention:

The present invention relates to information display apparatuses, and particular to an information display apparatus which includes control means for controlling display means to display several kinds of information based on a program, and in which the control means interrupt the program so as to perform a restart process, when it becomes necessary to restart during executing the program; and relates to navigation apparatuses, and particular to a navigation apparatus for performing a guidance by means of displaying a route to a destination on display means based on present position data from a position sensor and map data by using control means.

2. Related Art:

In an information display apparatus such as a vehicular navigation apparatus, recently, a voice recognizing function, a 3D graphic function, or a communication function such as an Internet including VICS has been added. As a result, functions to be processed become too complicated, so that a CPU as control means needs to process huge amount of processes.

Furthermore, in a case where plural programs are executed at the same time, the program may enter an abnormal condition in which a normal operation is not secured during executing the program, depending on the executed process because of the following reasons. That is, an access to a memory and a writing of the data may conflict each other; or an access to an odd address, an access to a write-protected region, or an undefined interruption process, may occur.

In such a case, the CPU generally interrupts the program so as to restart. However, in a case of the vehicular navigation apparatus as shown in FIGS. 11A–11D, when the restart process is executed while a map is displayed as a result of executing a route guidance operation (see FIG. 11A), a map display condition is suddenly stopped and no (blank) picture is temporally displayed on a screen as shown in FIG. 11B, namely a black picture condition.

After that, when the program is reloaded and each of the initial setting operations are completed, an initial picture is displayed (see FIG. 11C), both the present position data and the map data are inputted as a result of executing the program, and the present position is additionally displayed on the map, so as to return a condition before the restart.

However, it takes long time to execute several initializing process by the CPU of the control circuit or execute an initializing process of several input/output devices being connected, similar to the initial (first) startup just after a power is turned on. Therefore, it takes a constant time (10 seconds or more) to start to display a picture, because the picture is displayed on the display unit after these processes are completed.

When such the restart process is suddenly started, a user, who does not recognize the executing of the restart process, may feel that the apparatus may be broken down. Incidentally, a user, who recognizes the start of the restart process, needs to wait relatively long time to restore.

SUMMARY OF THE INVENTION

The present invention has been conceived in view of the above background, and its first object is to provide an information display apparatus and a navigation apparatus each of which can reduce a restore time needed for restoring a display condition as much as possible.

Its second object is to provide an information display apparatus and a navigation apparatus each of which can reduce a restore time needed for restoring a display condition as much as possible when it becomes necessary to restart a program while displaying information, by appropriately omitting several initializing processes during a starting-up.

According to one aspect of the present invention, during a restart process of the program, display control means read display picture information at restart timing from storing means and display it on display means. Therefore, it prevents the display means from becoming no display condition even in the restart process and can continuously display a picture. When it needs certain time to complete the restart process, a time needed to restore the display condition can be reduced as much as possible, it can prevent user's incongruity feeling, and it does not take long time to start to display.

According to another aspect of the present invention, when it becomes necessary to restart of the program, the control means interrupt the program so as to execute the restart process. Here, since the initializing process for external inputting means is generally completed at the first startup process, the restart process omits this process to start up in a short time. Thus, it can prevent the user from waiting for a long time equal to that of the first start up, under a condition that the display means display no picture.

According to still another aspect of the present invention, a navigation apparatus operates so that control means perform guidance by displaying a route to a destination on the display means based on present position data from a position sensor and map data. Here, when it becomes necessary to restart of the program during executing the route guidance based on the program, the control means interrupt the program so as to perform the restart process. During a restart process, display control means read display picture information at restart timing from storing means and display it on display means. Therefore, it can prevent the display means from becoming no display condition. For the user, since it can prevent the inconvenience that the display means suddenly become no display condition and the user has to wait until the startup condition, the user will not be worried during the route guidance and the user does not have to wait for long time until displaying.

BRIEF DESCRIPTION OF THE DRAWINGS

These and another objects, features and characteristics of the present invention will be appreciated from a study of the following detailed description, the appended claims, and drawings, all of which form parts of this application. In the drawings, same portions or corresponding portions are put the same numerals each other to eliminate redundant explanation. In the drawings:

DESCRIPTION OF THE PREFERRED EMBODIMENTS (First Embodiment)

Figure 1:
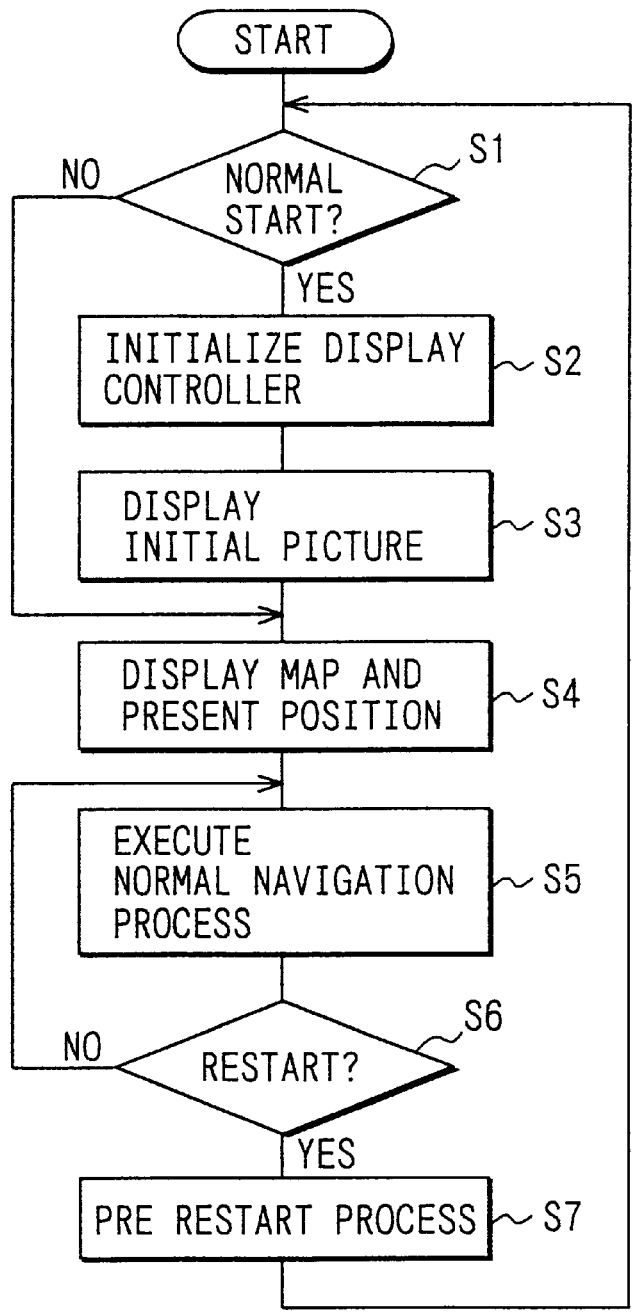
FIG. 1 is a schematic flowchart illustrating a display control of a first embodiment of the present invention.

Hereinafter, a first embodiment in which the present invention is applied to a vehicular navigation apparatus will be explained with reference to FIGS. 1 through 3.

Figure 2:
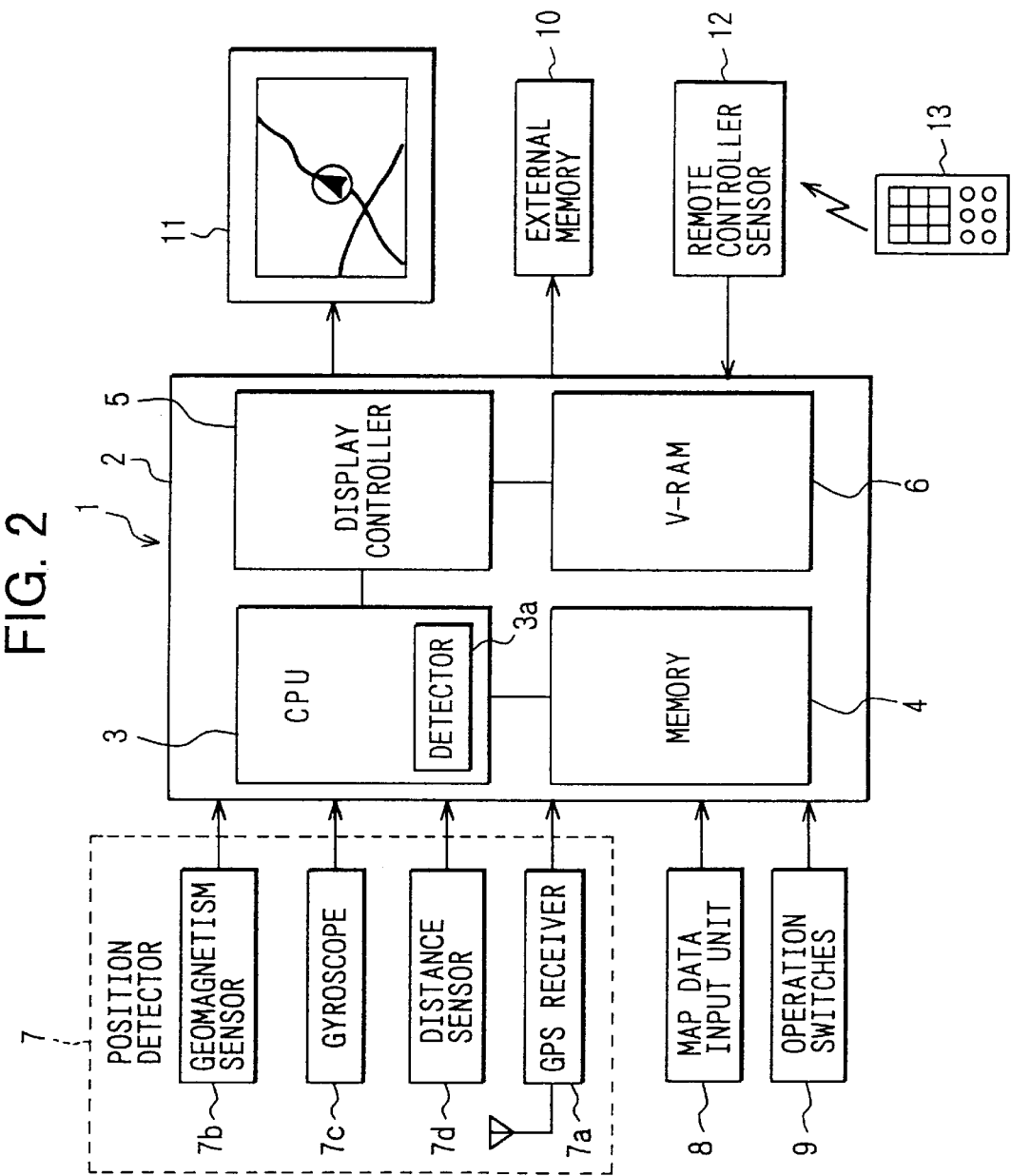
FIG. 2 is an electrical configuration.

FIG. 2 shows an electrical structure of a vehicular navigation apparatus 1 that is constructed as follows. A control circuit 2 for performing all controls is mainly made up of a microcomputer, and includes a CPU 3 as controlling means, a memory 4, a display controller 5 as display control means, a V-RAM 6 as storing means, and so on. The control circuit 2 also includes an interface circuit, a bus line for transmitting data, and so on.

The CPU 3 is provided therein with a detector 3a as detecting means. The CPU 3 detects a generation of an improper access, an undefined interruption, or undefined command (so called a runaway of a program) during executing the program. Then, the CPU 3 jumps to a vector address to execute a previously determined exception process. Here, in this case, for example, a restart process is executed as the exception process.

The display controller 5 independently operates from the CPU 3. The display controller 5 writes display picture information into the V-RAM 6 based on display control contents to be outputted from the CPU 3, and displays the data in the V-RAM 6 on a display unit 11. As described later, the display controller 5 displays data of map display picture including a present position, which is stored in the V-RAM 6, on the display unit 11 while the CPU 3 performs the restart process.

The memory 4 previously stores a program regarding route guidance, a display program for performing three-dimensional display, or a program for performing voice recognition, as control programs for a vehicular navigation.

The control circuit 2 is connected to a position detector 7 as a position sensor for detecting a position of the vehicle to receive a position detection signal. The position detector 7 is made up of several kinds of sensors such as a GPS (Global Positioning System) receiver 7a, a geomagnetism sensor 7b, a gyroscope 7c and a distance sensor 7d.

Since each of the sensors 7a–7d has different types of detection errors, each of the sensors 7a–7d performs high accurate position detection by interpolating the detection errors each other. Here, it is not necessary to provide all of these sensors 7a–7d depending on a level of desired detection accuracy, and one of them can be selectively provided. Furthermore, a rotation sensor for steering or a wheel sensor for detecting rotations of each tire may be provided.

A map data input unit 8 inputs several kinds of data to the control circuit 2. The several kinds of data includes: so-called map matching data for improving accuracy of the position detection; several data including map data and landmark data; or a program module or search data so as to use several search function. A medium in which the data is to be inputted is generally selected from a data-storing medium such as a DVD-RAM and a CD-ROM, or may be selected from a memory card. Furthermore, each of the data may be inputted from outside via communication.

Operation switches 9 are integrally provided on a case of the display unit 11 described later, and are made up of several types of operation switches for inputting data or setting parameters. An external memory 10 as storing means stores data to be used in the control circuit 2, historical data of the restart process and so on, at need. The external memory 10 is selected from a non-volatile memory unit such as an EEPROM or a recordable medium such as an IC card.

The display unit 11 as display means is made up of a color liquid crystal panel. During map display condition, a vehicular present position mark is displayed on a display screen of the display unit 11, and the map corresponding the vehicular present position is displayed thereon based on the map data inputted from the map data input unit 8. On the map, the guidance route is additionally displayed to perform route guidance display.

The remote control sensor 12 inputs the data or the setting parameter via a remote controller 13 instead of using the operation switches 9. The remote control sensor 12 receives infrared ray from the remote controller 13, converts this into electrical signal, and outputs to the control circuit 2. Here, however it is not shown, a voice input/output device for inputting voice or performing voice guidance is also connected, and a communication apparatus for performing communication such as the VICS and the Internet.

Next, operations of this embodiment will be explained with reference to FIGS. 1 through 3. Here, in this embodiment, a flowchart of a display control operation as shown in FIG. 1 is described mainly regarding a display control of the display unit 11. The restart process of the control circuit 2 described after is omitted.

When a power is supplied to start a navigation operation, the CPU 3 of the control circuit 2 performs several initializing processes, reads out a program from the memory 4, and then starts up the program by reading the data stored in the data-storing medium such as the DVD-ROM via the map data input unit 8.

Figure 11A:
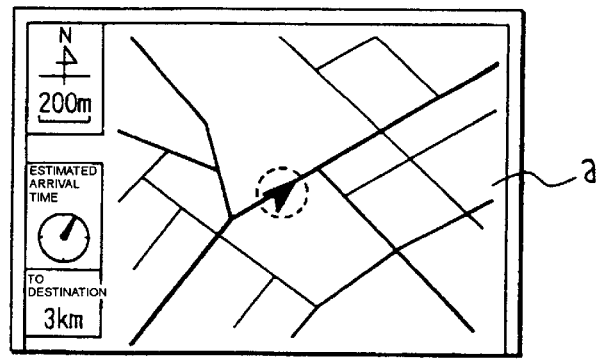
FIGS. 11A through 11D are schematic diagrams each of which illustrating a transition of the display picture during a restart process of the related art.
Figure 11B:
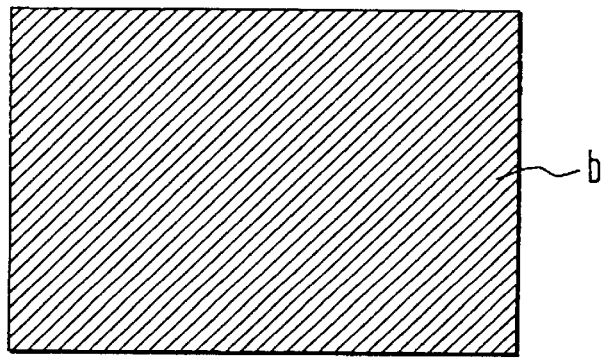
Figure 11C:
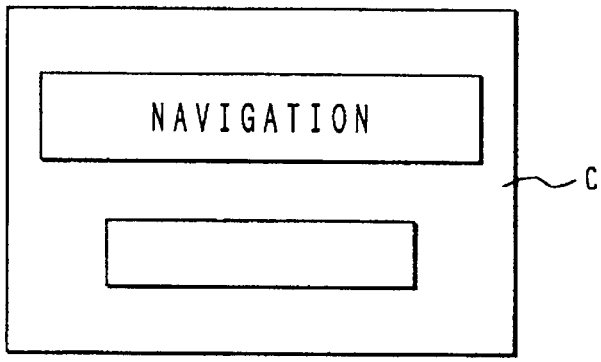

Regarding the display control of the display unit 11, since it is a normal start condition (step S1), the CPU 3 initializes the display controller 5 (step S2), and then displays an initial picture (step S3). In this time, similar to an apparatus of a related art, the CPU 3 displays the initial picture for displaying "NAVIGATION" as shown in FIG. 11C from the black picture condition as shown in FIG. 11B. However, it is not shown in this drawing, the control circuit 2 further performs the initializing process for other relative portions or the startup process operation including initializing processes of several types of devices.

Figure 3:
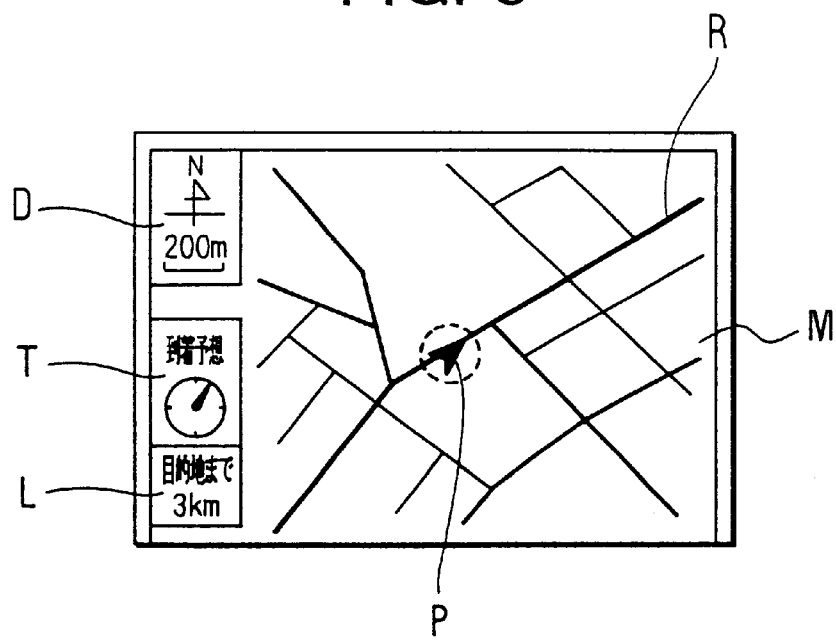
FIG. 3 is a schematic diagram illustrating a map display picture of a present position.
Figure 11D:
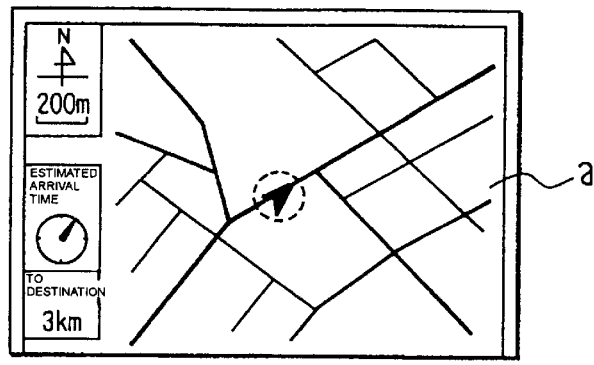

As a result, when the CPU 3 becomes a startup condition after reading the program, the CPU 3 calculates a present position based on detection signals from the sensors 7a–7d of the position detector 7, reads out the map data, which includes the present position, under a predetermined reduced scale from the DVD-RAM via the map data input unit 8, so that the map based on the read map data is displayed on the display unit 11 by superimposing with the present position data, as shown in FIG. 3 (or see FIG. 11D) (step S4). After that, the CPU 3 performs the route guidance operation or the display operations for several kinds of data from a selection menu picture based on the program, as the normal navigation process (step S5).

A pointer P for indicating the present position, a route R to be guided, information D regarding a direction of the map and the reduced-scale, information T regarding estimated arrival time to a destination, information L regarding a distance to the destination and so on, are displayed on a map display picture M of the display unit 11 as shown in FIG. 3. Here, the map display picture M displays the present position. During the normal navigation process, when the route is set by setting the destination, all of these data are displayed.

In this case, the CPU 3 of the control circuit 2 reads the display program for performing the three-dimensional display or the program for performing the voice recognition in addition to the program for the normal route guidance, so as to executes these programs at the same time. Thus, a user can drive or obtain data based on the route guidance information or several data displayed on the display unit Incidentally, the processing of the CPU 3 becomes more complicated as a result of starting up plural programs at the same time. Therefore, the improper command for accessing the odd address of the memory 4 and so on, or the improper exception such as undefined interruption process or the undefined command may occur, depending on a condition. The CPU 3 jumps to an address for performing the exception process based on the detection signal. In the case where the content of the improper process cannot be restored when the program is being executed, the CPU restarts by interrupting the program.

Therefore, when it becomes necessary to restart under a predetermined condition (step S6), the CPU 3 performs a pre-process of the restart (step S7). These steps are for preventing the display condition of the display unit 11 from being the black picture condition during the restart process. These steps transfer the data of the map display picture for displaying the present position, as shown in FIG. 3, to the V-RAM 6 to be stored therein, and keep this condition. Here, in this pre-process of the restart, the CPU 3 controls the external memory 10 to store a fact that the restart occurs in addition to essential data such as data of occurrence date as the historical data.

After that, the CPU 3 returns to step S1. Since it is not normal restart, the CPU 3 jumps to step S4 by omitting the initializing step of the display controller 5 (step S2), and the display process of the initial picture (step S3). In this case, the display controller 5 has initialized at the first startup process, there is no inconvenience even if this process is omitted in the restart process. After that, when the CPU 3 supplies signals for display control to the display controller 5 to display the present position and the map at step S4, the display controller 5 reads out the data for map display picture, which is stored in the V-RAM 6, so that the read data is displayed on the display unit 11.

As a result, even in the case where the display condition of the display unit 11 at the time when the restart process occur includes the map display picture including the present position, the display condition of the display screen as shown in FIG. 3 is maintained to display it. Furthermore, the CPU 3 performs the several initializing processes or programs and the initial setting operation, while the map including the present position is displayed.

After that, when the CPU 3 starts up the program, The CPU 3 performs the normal navigation process, that is route guidance operation, based on the program. Apparently, the restart process is executed without changing the display condition of the display unit 11. Therefore, the route guidance can be continued without user's recognition. In a case where the user operates during the restart process, the display may be interrupted until the restart process is completed because the display needs to change. However, the CPU 3 can restore to a normal condition without causing uncertain feeling or decreasing reliability against the apparatus, because there is no chance to become the black picture condition in which all display are disappeared. Furthermore, in the display picture of the map including the present position, the estimated arrival time information T, the distance information L to the destination, or the route information R are also displayed other than the present position pointer P, the user can obtain the needed guidance information during the driving.

Here, in the case where the display unit 11 does not display the map including the present position at the time the restart occurs, when the restart process starts, the display condition may be suddenly changed. In this case, the user may be realized that the apparatus performs the restart process. In such a case, since the display unit 11 displays the map including the present position, which is useful information for route guidance, an incongruity due to a changing of the display.

Here, the reason to display the map including the present position on the display unit 11 during the restart process is as follows. In the navigation apparatus, the picture to be displayed is mainly the map including the present position. Furthermore, the display condition does not change frequently, but gradually changes as the vehicle travels. Therefore, even if the present position changes during the restart process, this change is small, and there is substantially no harm for the display operation.

According to this embodiment, the control circuit 2 controls the external memory 10 to store the data of the map display picture including the present position at the time when it becomes necessary to restart, and controls the display controller 5 to display the map display picture at the start timing of the restart process. Therefore, there is no chance to become the black picture condition on the display unit 11 during the restart process. Furthermore, when the restart process is executed while the present position is displayed, since the display condition continues, there is no incongruity due to performing the restart process and it can restore to the normal startup condition, and therefore it can improve the reliability.

Here, in the case where the restart process is performed in such a way, the CPU 3 stores the historical data into the external memory 10. Therefore, even if the restart is performed without user's recognition, the user can recognize the restart from the historical data and use for investigating a root.

(Second Embodiment)

Figure 4:
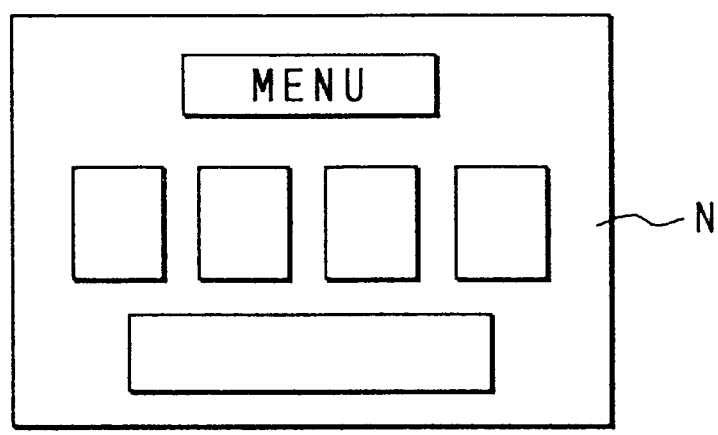
FIG. 4 is a schematic diagram illustrating a menu display picture of a second embodiment of the present invention.

FIG. 4 shows a second embodiment of the present invention. This embodiment is different from the first embodiment in the following point. That is, a menu picture N, which is previously stored in the external memory 10, is displayed as shown in figure, instead of displaying the map picture including the present position at the time the restart process starts.

As a result, when the restart process is performed, the menu display picture is displayed on the display unit 11, so that a next process can be determined based on the display.

Here, the second embodiment may be combined with the first embodiment, in which the map including the present position is displayed, so that the user can previously select one of them. Thus, it becomes more convenient for the user.

(Third Embodiment)

Figure 5:
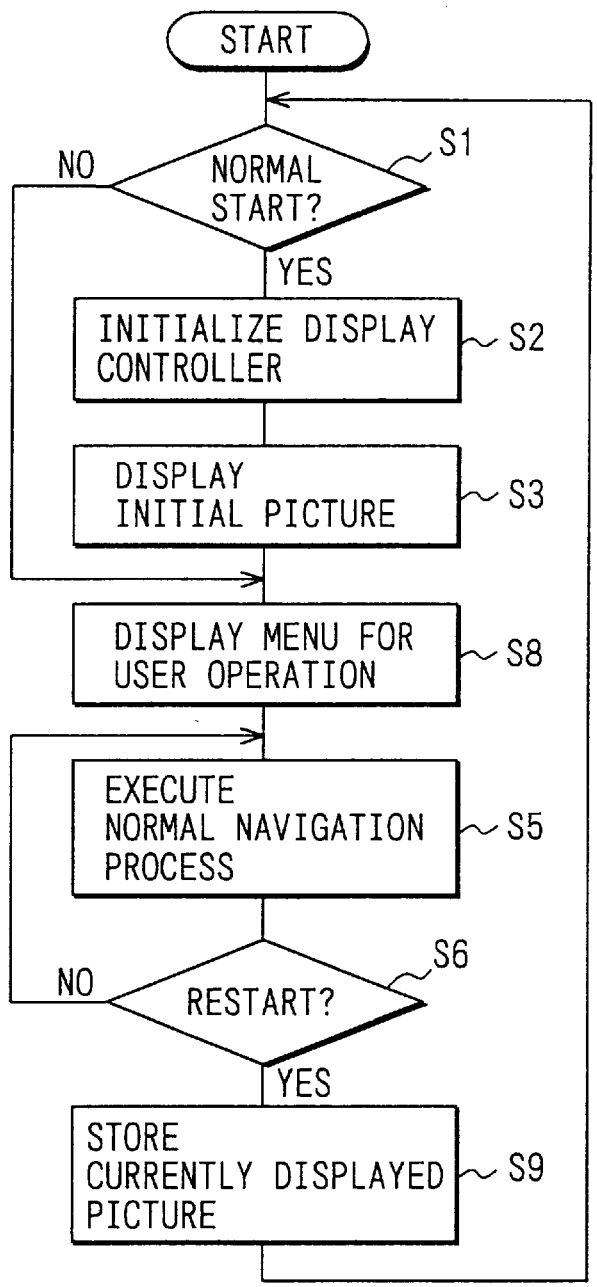
FIG. 5 is a schematic flowchart illustrating a display control of a third embodiment of the present invention.

FIG. 5 shows a third embodiment of the present invention. This embodiment is different from the first embodiment in the following point. That is, at the normal restart, a picture to be displayed on the display unit 11 after displaying the initial picture is the same picture as that is lastly displayed in the last time (step S8), and when the restart occurs, picture data being displayed on the display unit 11 at that timing is stored in the V-RAM 6 as a user operation picture data (step S9).

As a result, the information being displayed on the display unit 11 is directly stored in the V-RAM 6 at the timing when the restart occurs (step S6), and this picture is displayed during executing the restart process. Therefore, the display condition can be continued between before and after the restart whatever kind of picture is displayed. Therefore, the restart process can be executed without user's incongruity feeling.

(Fourth Embodiment)

Figure 6:
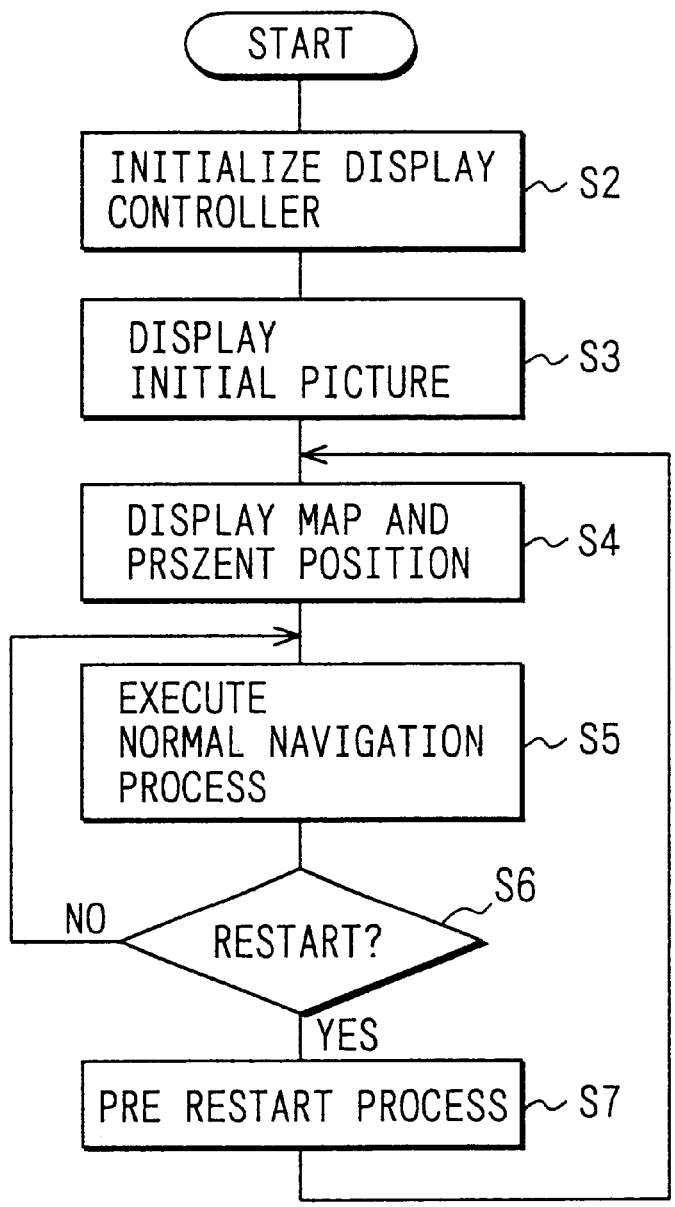
FIG. 6 is a schematic flowchart illustrating a display control of a fourth embodiment of the present invention.

FIG. 6 shows a fourth embodiment of the present invention. This embodiment is different from the first embodiment in the following point. That is, the judgment step S1 for judging whether it is normal or not is omitted, so as to move to the steps S2, S3, S4 and S5, when it is the normal startup. When the restart occurs (step S6), the CPU 3 executes the pre-process of the restart (step S7), and then directly moves to step S5.

As a result, the restart process can rapidly executed by reducing the judgment process. Here, in this case, the menu picture may be displayed similar to the second and the third embodiments, or the display picture information at the time the restart occurs may be stored in the external memory 10 and may be displayed during the restart process.

(Fifth Embodiment)

Figure 7:
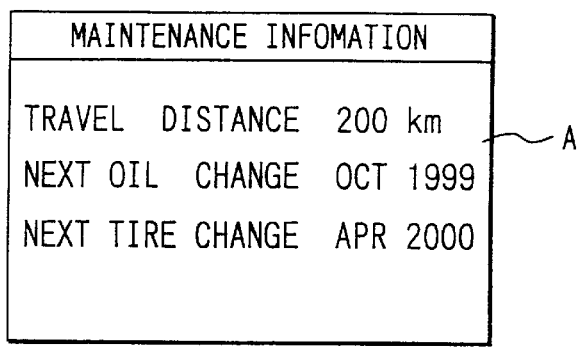
FIG. 7 is a schematic diagram illustrating a maintenance information picture of a fifth embodiment of the present invention.

FIG. 7 shows a fifth embodiment of the present invention. This embodiment is different from the second embodiment in the following point. That is, a vehicular maintenance information picture A is displayed on the display unit 11 during the restart process, instead of the menu display picture. The maintenance related information regarding the vehicle is previously registered, and is displayed during the restart process.

As the maintenance information picture A, for example, travel distance data, a next oil change timing, or a next tire change timing is determined. When these next change timings are registered every time the oil is changed or the tire is changed, the information can be displayed. Furthermore, the travel distance from a point where the travel distance is reset to zero can be displayed. Thus, forgettable next oil change timing and forgettable next tire change timing can be informed. Therefore, useful information can be obtained even in the restart process.

(Sixth Embodiment)

Figure 8:
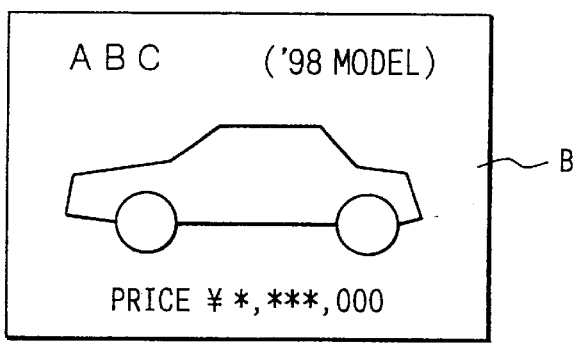
FIG. 8 is a schematic diagram illustrating a guidance information picture of a sixth embodiment of the present invention.

FIG. 8 shows a sixth embodiment of the present invention. This embodiment is different from the fifth embodiment in the following point. That is, a guidance information picture B such as prices of vehicles is displayed on the display unit 11 during the restart process, instead of displaying the menu display picture. The vehicular price guidance information, which is previously stored in the DVD-RAM or the like, is read out from the external memory 10 during normal startup, is stored into the V-RAM 6 at the time before the restart process starts, and is displayed on the display unit 11 when the restart process starts.

Thus, guidance information, which is not displayed during the normal operation, is displayed on the display unit 11 during the restart process. As a result, the restart process can be executed with displaying useful information for the user.

(Seventh Embodiment)

Figure 9:
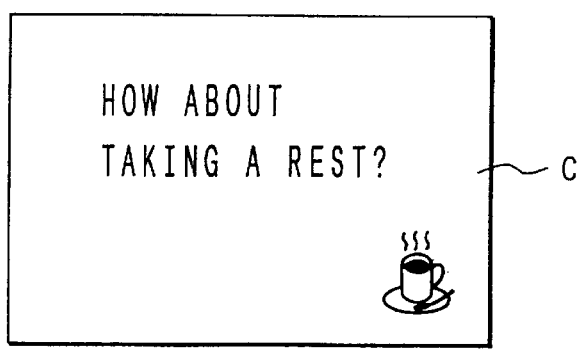
FIG. 9 is a schematic diagram illustrating an attention attraction picture of a seventh embodiment of the present invention.

FIG. 9 shows a seventh embodiment of the present invention. This embodiment is different from the fifth embodiment in the following point. That is, an attention attraction display picture C for the user is displayed on the display unit 11 during the restart process, instead of displaying the menu display picture. What previously stored in the external memory 10 or what previously stored in the DVD-RAM or the like is transferred and stored into the external memory 10. This data is stored in the V-RAM 6 when the restart occurs, and is displayed after the restart process starts. The display picture is for attracting an attention, such as "HOW ABOUT TAKING A REST?"

In this case, a travel distance is detected and the attention attraction picture may be changed depending on the travel distance, or the attention attraction picture may be changed depending on an occasion. Thus, since the attention attraction picture C is displayed during the restart process, the restart process can be executed without user's incongruity feeling.

Here, in the case where such a display is performed, when the attention attraction picture is displayed while the restart does not occur, the restart process can be naturally performed without user's recognition.

(Eighth Embodiment)

Figure 10:
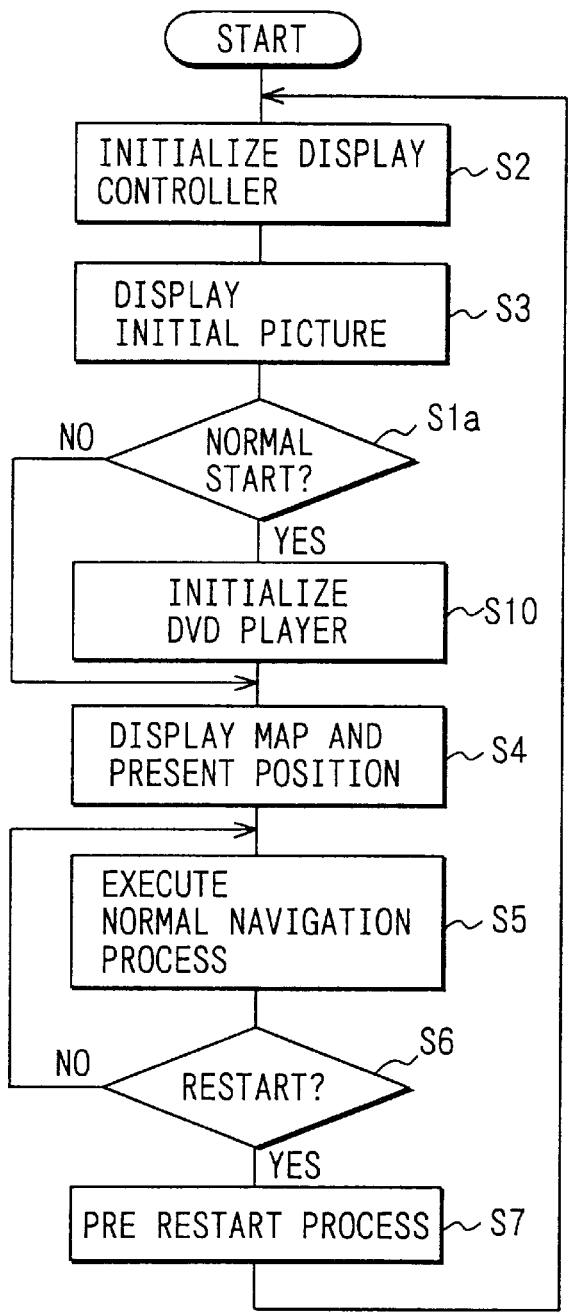
FIG. 10 is a schematic flowchart illustrating a display control of an eighth embodiment of the present invention.

FIG. 10 shows an eighth embodiment of the present invention. This embodiment is different from the first embodiment in the following point. That is, a total time for the restart process itself is reduced to remove user's irritation due to the occurrence of the black picture, instead of some picture is temporary displayed on the display unit 11 during the restart process.

Specifically, the control circuit 2 executes the initializing process (step S2) of the display controller 5, which is executed at the startup timing, or the display process of the initial picture (step S3) is executed during the restart process. Instead of this, the controller 2 performs the initialing process for a DVD player as the map data input unit 8 during initial start process (step S10). On the contrary, during the restart process, this process (step S4), which is not necessary because it is already executed, can be omitted to move to step S4.

As a result, it can reduce a time from approximately 5 seconds to approximately 10 seconds needed for initializing the DVD player, for example. The restart process can be immediately ended so restore the normal condition.

According to the first to eighth embodiment described in the above, when it becomes necessary to restart the program during displaying the information, it can reduce the time to restore the display condition as much as possible, by omitting several initializing processes when the apparatus restarts.

The present invention is not limited to the embodiments in the above, and may be modified or expanded.

The detector 3a is provided in the CPU 3, however, it may be provided at outer side.

When the restart occurs, the data of the display picture to be displayed by the display controller 5 is stored in the V-RAM 6; however, the data may be stored in the external memory 10 instead. In this case, the display controller 5 can obtain similar operation and effect, when the display picture data is read out from the external memory 10 while the CPU 3 performs the restart process.

Other specific pictures can be thought. For example, several display pictures in which popular character is drawn may be prepared and may be displayed every time.

When the display contents in the attention attraction picture are also outputted by voice sound, it can further improve the effect.

When the apparatus has structure in which the data can be obtained through the Internet or VICS, the specific picture can be selected one of them. The specific picture may be frequently updated to provide up-to-date information.

The present invention can be applied to a navigation apparatus for guiding pedestrian other than the vehicular navigation apparatus, or can be applied to information display apparatuses such as a personal computer or other terminals.

What is claimed is:

1. An information display apparatus comprising:
   control means for controlling display means to display several types of information based on a program, and for interrupting an execution of the program so as to perform a restart process when it becomes necessary to restart the program during execution of the program;
   storing means for storing display picture information at restart timing to be displayed on the display unit during the restart process of the program; and
   display control means for reading out the display picture information at restart timing from the storing means during the restart process of the program, and for displaying the display picture information at restart timing.

2. An information display apparatus according to claim 1, wherein the control means controls the display means to display the information via the display control means, and omits an initializing process for the display control means at the restart process of the program.

3. An information display apparatus according to claim 1, further comprising detecting means for detecting occurrence of an improper process during execution of the program,
   wherein the control means interrupts the program to execute the restart process when the detecting means detects the improper process.

4. An information display apparatus according to claim 1, wherein the storing means stores the display picture information on the display means when it becomes necessary to restart the program.

5. An information display apparatus according to claim 1, wherein the storing means previously stores a predetermined specific picture information as the display picture information at restart timing.

6. An information display apparatus according to claim 5, wherein the specific picture information is guidance information.

7. An information display apparatus according to claim 5, wherein the specific picture information is a menu display picture for selectively setting a display content.

8. An information display apparatus according to claim 1, wherein the control means stores an occurrence condition of the restart process as historical information, and then performs the restart process when it becomes necessary to restart the program.

9. A navigation apparatus according to claim 1, wherein the control means performs the restart process when runaway of a program is generated.

10. A navigation apparatus according to claim 9, wherein the runaway of a program includes one of an improper access, an undefined interruption, and an undefined command.

11. An information display apparatus comprising:
    control means for controlling display means to display several types of information based on a program, and for interrupting an execution of the program so as to perform a restart process when it becomes necessary to restart the program during execution of the program,
    wherein the control means omits an initializing process for external inputting means, which inputs external information, at the restart process.

12. An information display apparatus according to claim 11, wherein the external inputting means is an input unit of an information storing medium in which information is stored in a disk.

13. A navigation apparatus according to claim 11, wherein the control means performs the restart process when runaway of a program is generated.

14. A navigation apparatus according to claim 13, wherein the runaway of a program includes one of an improper access, an undefined interruption, and an undefined command.

15. A navigation apparatus comprising:
    control means for controlling display means to display a route to a destination based on present position data from a position sensor and map data, and for interrupting execution of a program to perform a restart process when it becomes necessary to restart the program during execution of the program;
    storing means for storing display picture information at restart timing to be displayed on the display unit during the restart process of the program; and
    display control means for reading out the display picture information at restart timing from the storing means during the restart process of the program, and for displaying the display picture information at restart timing.

16. A navigation apparatus according to claim 15, wherein the storing means stores the display picture information on the display unit when it becomes necessary to restart the program.

17. A navigation apparatus according to claim 15, wherein the storing means stores a map display picture indicating the present position when it becomes necessary to restart during execution of the program as the display picture information at restart timing.

18. A navigation apparatus according to claim 15, wherein the storing means stores a menu picture as the display picture information at restart timing.

19. A navigation apparatus according to claim 11, wherein the storing means stores a predetermined attention attraction picture as the display picture information at restart timing.

20. A navigation apparatus according to claim 15, wherein the control means performs the restart process when runaway of a program is generated.

21. A navigation apparatus according to claim 20, wherein the runaway of a program includes one of an improper access, an undefined interruption, and an undefined command.

* * * * *